Aug. 20, 1935.  D. W. PHILLIPS  2,011,649
APPARATUS FOR MAKING PRECISE DENTAL CASTINGS
Original Filed Dec. 10, 1932
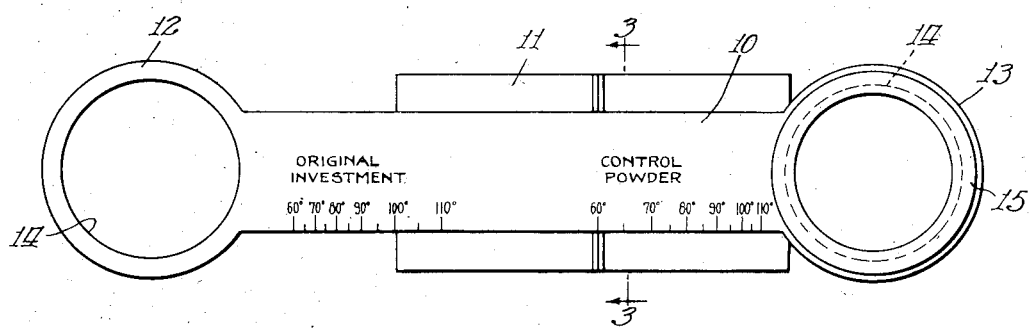
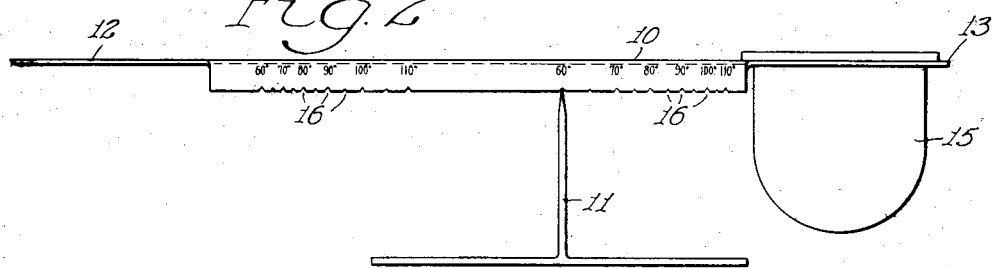
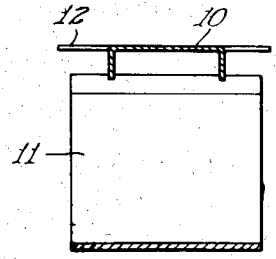
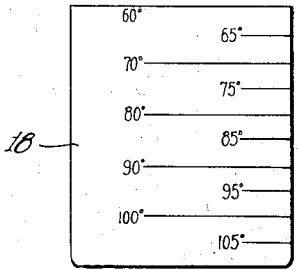
Witness:
V. Siljander
Inventor
David W. Phillips
By: Hill + Hill Patented Aug. 20, 1935

2,011,649

UNITED STATES PATENT OFFICE 2,011,649

APPARATUS FOR MAKING PRECISE DENTAL CASTINGS

David W. Phillips, Chicago, Ill.

Original application December 10, 1932, Serial No. 646,673. Divided and this application June 2, 1933, Serial No. 674,018

7 Claims. (Cl. 265—34)

My invention relates to scales and volumetric measuring apparatus and more particularly it relates to scales and measuring apparatus adjustable to automatically weigh or measure out different portions of ingredients of an admixture.

The scale is adapted for a variety of uses and among others for correctly proportioning ingredients of admixtures used in practicing the method set forth in my co-pending application, Serial No. 646,673, filed December 10, 1932, of which this is a divisional application. My aforesaid application covers a novel method of regulating the expansion of investment material used in making dental castings, such investment material comprising as its ingredients a high expansion material designated as original investment material and a lower expansion material designated as control powder. In practicing the method, the proportions of the original investment material and of the control powder are varied in accordance with the room temperature to effect exact compensation for the resulting shrinkage variables at different investing room temperatures. The invention contemplates the provision of apparatus adapted for precisely proportioning the materials used in the investing admixture although it may be used for other than investing admixtures.

An object of the invention is the provision of improved apparatus adapted to automatically proportion the ingredients of an admixture in accordance with a predetermined schedule of temperatures.

Another object of the invention is the provision of improved weighing and measuring apparatus adapted for precisely proportioning original investment material and control powder constituents of an admixture of the kind described for investing at any prevailing room temperature in order that the admixture will provide the necessary quantity for one investing operation and that the expansion of the resulting investment admixture will provide the proper balance for shrinkages at the prevailing room temperature.

Many other objects and advantages of the construction herein shown and described will be obvious to those skilled in the art from the disclosure herein given.

To this end, my invention consists in the novel construction, arrangement and combination of parts herein described and shown, and more particularly pointed out in the claims.

In the drawing, wherein like reference characters indicate like or corresponding parts:

Fig. 1 is a plan view of a novel and improved weighing apparatus found satisfactory for properly proportioning admixtures at any prevailing room temperature;

Fig. 2 is an elevational view of the device shown in Fig. 1;

Fig. 3 is a section along the line 3—3 of Fig. 1; and

Fig. 4 is a view of a measuring flask especially adapted for properly proportioning of the admixture by volume.

Referring now more particularly to the drawing, Figs. 1, 2 and 3 illustrate a scale which is adjustable to automatically proportion the correct amount of both original investment material and control powder required for investing at any particular prevailing room temperature and which at the same time, provides the proper total amount of the admixture for one investing operation. This is accomplished without the use of any counterbalance weights and if desired with only one weighing receptacle which can be used for each material, the scale being of such weight and dimensions that it provides in itself the necessary counterbalance as the fulcrum points are changed in accordance with different prevailing room temperatures in weighing out either the original investment material or the control powder.

The following proportions and weights exemplify the amounts of original investment material and control powder found effective for practical work at room temperatures indicated, although satisfactory results are obtained by slight deviations therefrom:

| Investing room temperature | Original investment material | Control powder | Admixture totals |
|---|---|---|---|
| °F | Grams | Grams | Grams |
| 60 | 40 | 0 | 40 |
| 65 | 36 | 5.0 | 41.0 |
| 70 | 32 | 10.0 | 42.0 |
| 75 | 28 | 15.0 | 43.0 |
| 80 | 24 | 20.0 | 44.0 |
| 85 | 20 | 25.0 | 45.0 |
| 90 | 16 | 30.0 | 46.0 |
| 95 | 12 | 35.0 | 47.0 |
| 100 | 8 | 40.0 | 48.0 |
| 105 | 4 | 45.0 | 49.0 |
| 110 | 0 | 50.0 | 50.0 |

The scale is adapted to weigh out the exact quantities set forth in the above table and comprises a balancing arm 10 adapted to be pivotally supported at any one of a plurality of fulcrum points, on a base member generally designated by the numeral 11. The arm 10 has an inverted U-shaped cross section over the greater portion of its length and terminates at its ends in annular or ring-shaped members 12 and 13 providing apertures 14 adapted to receive a cup or receptacle 15.

The balancing arm 10 is adapted to be supported on the base member 11 at any of a plurality of notches 16 formed in the lower edge of the arm, with the upper edge of the base member 11 providing a fulcrum. The notches 16 are arranged in two groups, each graduated from the left to the right as observed in Fig. 2 to indicate temperatures from 60 degrees Fahrenheit to 110 degrees Fahrenheit, the left hand group being used as fulcrum points in weighing out original investment material and the right hand group being used as fulcrum points in weighing out control powder.

The individual notches 16 comprising the right hand group are accurately positioned so that the exact amount of control powder required for an investing operation at a room temperature indicated by the legends above the respective notches, will be weighed out when the scale is balanced with the cup 15 containing the control powder positioned in the right hand receptacle 14.

The arm 10 is shown as mounted on the member 11 with the upper edge of the latter in the particular notch 16 of the right hand group having the legend 60 degrees. By reference to the table, it will be seen that the original investment material provides the proper compensation for shrinkages when investing at a room temperature of 60 degrees so that no control powder is required. The scale is so constructed as to be balanced in the position shown with the cup 15 empty. If the investing operation is to be performed at 65 degrees Fahrenheit, substantially five grams of control powder will be required for one investing operation and this amount will be accurately weighed out by positioning the arm 10 with the notch corresponding to 65 degrees Fahrenheit as a fulcrum point. The requisite amount of control powder for higher temperatures as indicated in the table will be provided by shifting the arm 10 so that its fulcrum point corresponds to the selected room temperature.

In weighing out the original investment material at any selected room temperature, the arm 10 will be shifted so that the extreme left hand notch 16 receives the upper edge of the base member 11 and the cup 15 is placed in the left hand aperture 14. The table indicates that 40 grams of original investment material and no control powder is required for an investing operation at a room temperature of 60 degrees. By pouring original investment material into the empty cup 15 until the scale is balanced, 40 grams of such material will be accurately weighed out. Similarly, for higher selected investing room temperatures, the arm will be shifted to the corresponding fulcrum points and the correspondingly lower weights of original investment material will be weighed out. Obviously, it makes no difference whether the original investment material or the control powder is first weighed out, it being understood of course, that after weighing out one portion each of the control powder and of the original investment material, they will be mixed together and used for one investing operation.

The control powder selected as exemplifying the invention provides the required expansion compensation when investing at 110 degrees Fahrenheit without the use of any original investment material. It will be observed by reference to the table that 50 grams of control powder provides a sufficient amount of investment material for one investing operation, and the scale is so constructed as to weigh out this amount when the arm is positioned with the member 11 in the extreme right hand notch 16 and the cup 15 positioned in the right hand aperture 14. Similarly, since no original investment material is required at a temperature of 110 degrees, if the arm 10 is positioned with the member 11 in the left hand notch 16 having the legend 110 degrees and with the empty cup 15 positioned in the left hand aperture 14, the scale will be balanced.

Automatic volumetric proportioning of the described materials can also be effected by the device shown in Fig. 4, which consists of a transparent measuring cup 18 of sufficient capacity to hold the correct admixture of investment materials employed for one investing operation. The cup 18 has selected room temperature graduations so arranged that when the original investment material is placed in the cup up to a graduation level corresponding to the selected room temperature, and is then filled with control powder level with the top, the requisite proportions of both materials are provided to correctly regulate expansion in the admixture for the particular investing room temperature selected. For example, for a selected room temperature of 60 degrees Fahrenheit, the cup 18 will be entirely filled with original investment material and no control powder will be contained in the investing admixture. By filling the cup with original investment material up to the level indicated at 65 degrees Fahrenheit, and then by completing the filling of the cup with control powder, an admixture will be secured providing the proper compensation for expansion at a temperature of 65 degrees. An admixture of proper proportions for a selected room temperature of 105 degrees will be effected by filling the cup to the level indicated by the graduation 105 degrees and then filling the cup to the top with control powder. Likewise for a selected room temperature of 110 degrees, no original investment material will be required and the cup 18 will be entirely filled with control powder.

Having thus described the invention, it is obvious that various immaterial modifications may be made in the same without departing from the invention; hence I do not wish to be understood as limiting myself to the exact form, construction, arrangement and combination of parts herein shown and described, or uses mentioned.

What I claim as new and desire to secure by Letters Patent is:

1. A weighing device comprising a supporting member having its upper edge providing a fulcrum, an arm having a plurality of notches on its lower edge each adapted to receive said fulcrum, said notches being arranged in predetermined spaced apart relation in two groups, said groups being on opposite sides of the arm, means on each end of the arm adapted as a receptacle support, and a receptacle adapted for positioning on either of said supports, each of said notches comprising a group being marked with an indicating temperature differing from that of the other notches of the same groups, the notches of each group being identical in number, temperature markings and sequence of markings, the notches of one group being so positioned that the arm will be balanced on the fulcrum at any selected notch by placing the receptacle on that end of the arm and adding a selected material to the receptacle in an amount predetermined as required as an ingredient of an admixture used in investing at room temperature indicated at the selected fulcrum, the notches of the other group being so positioned that the arm will be balanced on the fulcrum at any selected notch by placing the receptacle on that end of the arm and adding a different selected material to the receptacle in an amount predetermined as required as an ingredient of said admixture.

2. In a weighing apparatus, a balancing arm providing an aperture at each end, a receptacle adapted to be interchangeably seated in either of said apertures, and a base member providing a knife edge support for the arm, each half of said arm having a plurality of notches in its lower edge arranged in spaced relation and adapted to receive the knife support, the notches on each half of the arm most remote from the adjacent aperture being so located as to adapt the arm to be balanced thereabout when the empty receptacle is seated in the adjacent aperture, the other notches on each half of the arm being so positioned that the weight of the material requisite to be added to the receptacle when seated in the adjacent aperture bears a definite and predetermined ratio to the weight of material requisite to balance the arm about a corresponding notch on the other half when the receptacle containing such material is seated in the aperture adjacent thereto.

3. A device of the kind described adapted to separately and selectively weigh out predetermined proportions of two ingredients of an admixture, said device comprising a base member providing a knife edge support, a balance arm having an aperture in each end and a plurality of notches in its lower edge, a receptacle adapted to be interchangeably seated in said apertures, the notches on one half of said arm being located at fulcrum points adapting the arm to be balanced thereabout when the receptacle is seated in the adjacent aperture and contains predetermined graduated quantities of one of said ingredients, the notches on the other half of the arm being located at fulcrum points adapting the arm to be balanced thereabout when the receptacle is seated in the adjacent aperture and contains predetermined graduated quantities of the other of said ingredients.

4. A device of the kind described adapted to separately and selectively weigh out predetermined proportions of two ingredients of an admixture, said device comprising a base member providing a knife edge support, a balance arm having an aperture in each end and a plurality of notches in its lower edge, a receptacle adapted to be interchangeably seated in said apertures, the notch adjacent the median line in each half of the arm being located at a fulcrum point adapting the arm to be balanced thereabout when the empty receptacle is seated in its adjacent aperture, and the remaining notches on each half of the arm each being located at a fulcrum point adapting the arm to be balanced thereabout when the receptacle is seated in the adjacent aperture and contains a predetermined quantity of one of said ingredients.

5. In a weighing apparatus, a balancing arm terminating at each end in a platform providing an aperture, a receptacle adapted to be seated in either of said apertures, and a base member providing a knife edge support shiftable longitudinally of the arm, the cross section of said arm between said platforms being an inverted U with its lower edges each providing a plurality of spaced-apart notches in alignment with corresponding notches in the other edge, one pair of aligned notches in each end of said arm being so positioned that the arm will be balanced thereabout when the empty receptacle is seated in the adjacent aperture.

6. In a weighing apparatus, a balancing arm terminating at each end in a platform providing an aperture, a receptacle adapted to be seated in either of said apertures, and a base member providing a knife edge support shiftable longitudinally of the arm, the cross section of said arm between said platforms being an inverted U with its lower edges each providing a plurality of spaced-apart notches in alignment with corresponding notches in the other edge, one pair of aligned notches in each end of said arm being so positioned that the arm will be balanced thereabout when the empty receptacle is seated in the adjacent aperture, and the remaining pairs of notches in each end of the arm being so positioned that the weight of material requisite to be added to the receptacle when seated in the adjacent aperture bears a definite and predetermined ratio to the weight of material requisite to similarly balance the arm about a corresponding pair of notches on the opposite end.

7. A device of the kind described adapted to separately weigh out predetermined proportions of two ingredients of an admixture graduated in accordance with existing room temperature, said device comprising a base member providing a knife edge support, a balance arm having an aperture in each end and a plurality of notches on its lower edge, a receptacle adapted to be interchangeably seated in said apertures, the notch adjacent the median line on each half of the arm being located at a fulcrum point adapting the arm to be balanced thereabout when the empty receptacle is seated in its adjacent aperture, the remaining notches on each half of the arm each being located at a fulcrum point adapting the arm to be balanced thereabout when the receptacle is seated in the adjacent aperture and contains a predetermined quantity of one of said ingredients, the notches on both halves of the arm being successively and similarly graduated in the same direction for existing room temperatures within a selected range.

DAVID W. PHILLIPS.